United States Patent [19]
Smith

[11] 3,738,322
[45] June 12, 1973

[54] ANIMAL SHELTER
[76] Inventor: Mertie G. Smith, Route 2, Kuttawa, Ky. 42055
[22] Filed: Apr. 5, 1971
[21] Appl. No.: 131,245

[52] U.S. Cl. ................. 119/15, 119/17, 119/29
[51] Int. Cl. ......................................... A01k 1/00
[58] Field of Search ................. 119/15, 17, 18, 19, 119/29

[56] References Cited
UNITED STATES PATENTS

| | | | |
|---|---|---|---|
| 2,932,279 | 4/1960 | Giles | 119/15 |
| 3,035,544 | 5/1962 | Katt, Jr. | 119/19 |
| 3,381,663 | 5/1968 | Dayton | 119/15 |
| 2,987,043 | 6/1961 | Spindler | 119/19 X |
| 3,499,246 | 3/1970 | Loukas | 119/19 X |
| 3,581,708 | 6/1971 | Beck | 119/19 |

Primary Examiner—Aldrich F. Medbery
Attorney—Harrington A. Lackey

[57] ABSTRACT

An animal shelter including an enclosed hollow body having a front end opening surrounded by a laterally, exteriorly projecting marginal flange for engagement with the front surface of a wall having an opening through which the body extends rearwardly, and a pair of doors mounted in the opening upon double-acting hinges to permit free entry and exit by an animal.

4 Claims, 4 Drawing Figures

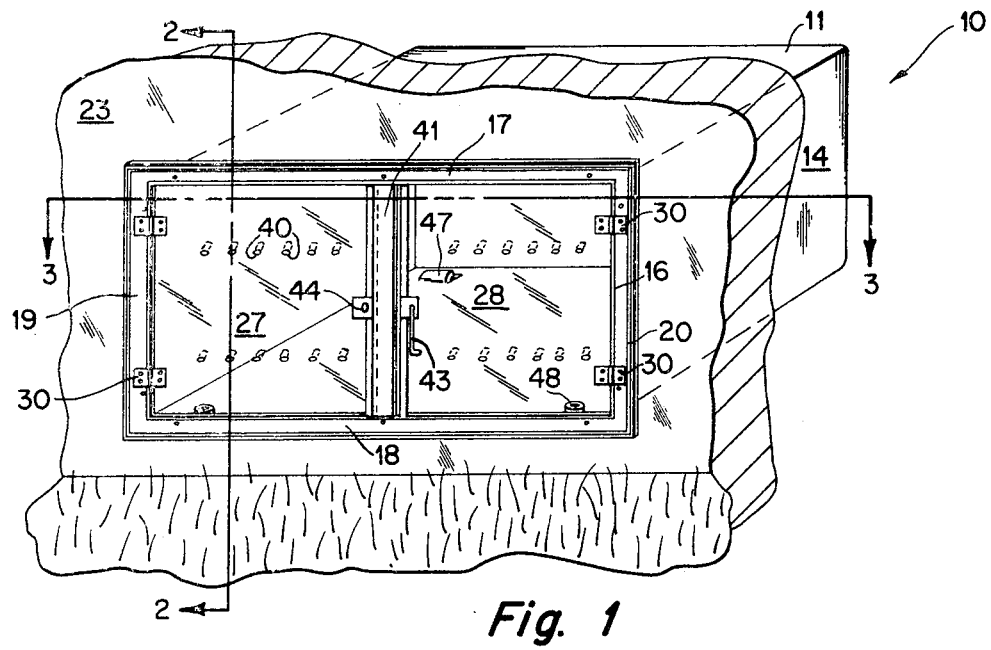
Fig. 1
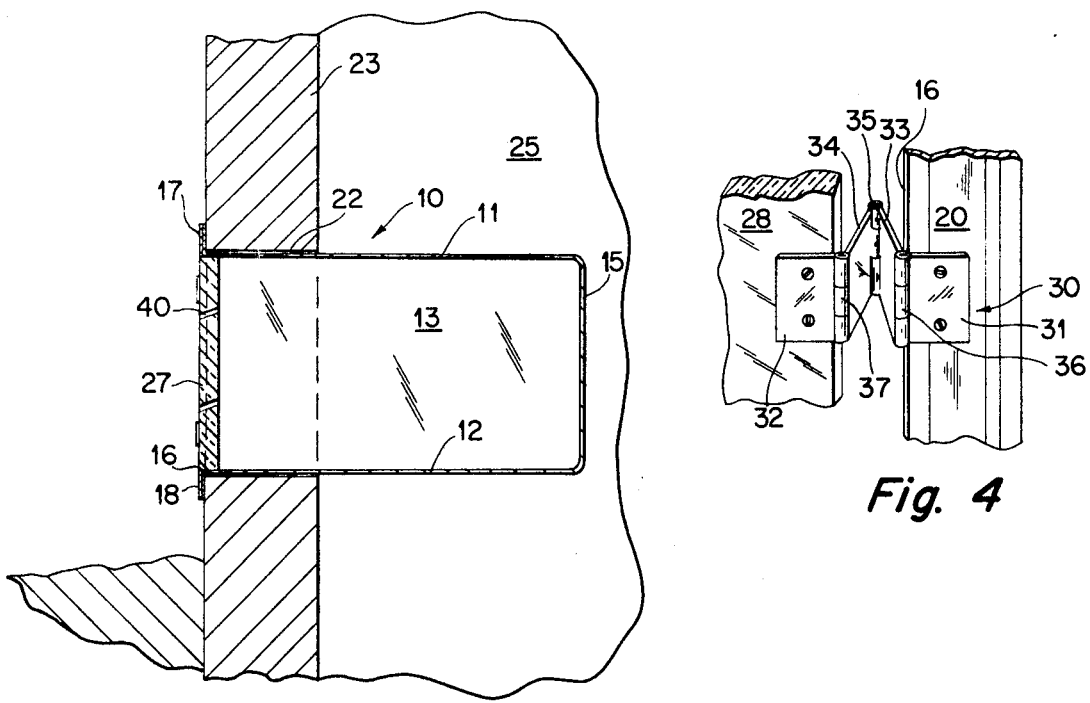
Fig. 2
Fig. 4
INVENTOR
MERTIE G. SMITH
BY Harrington A. Lackey
ATTORNEY

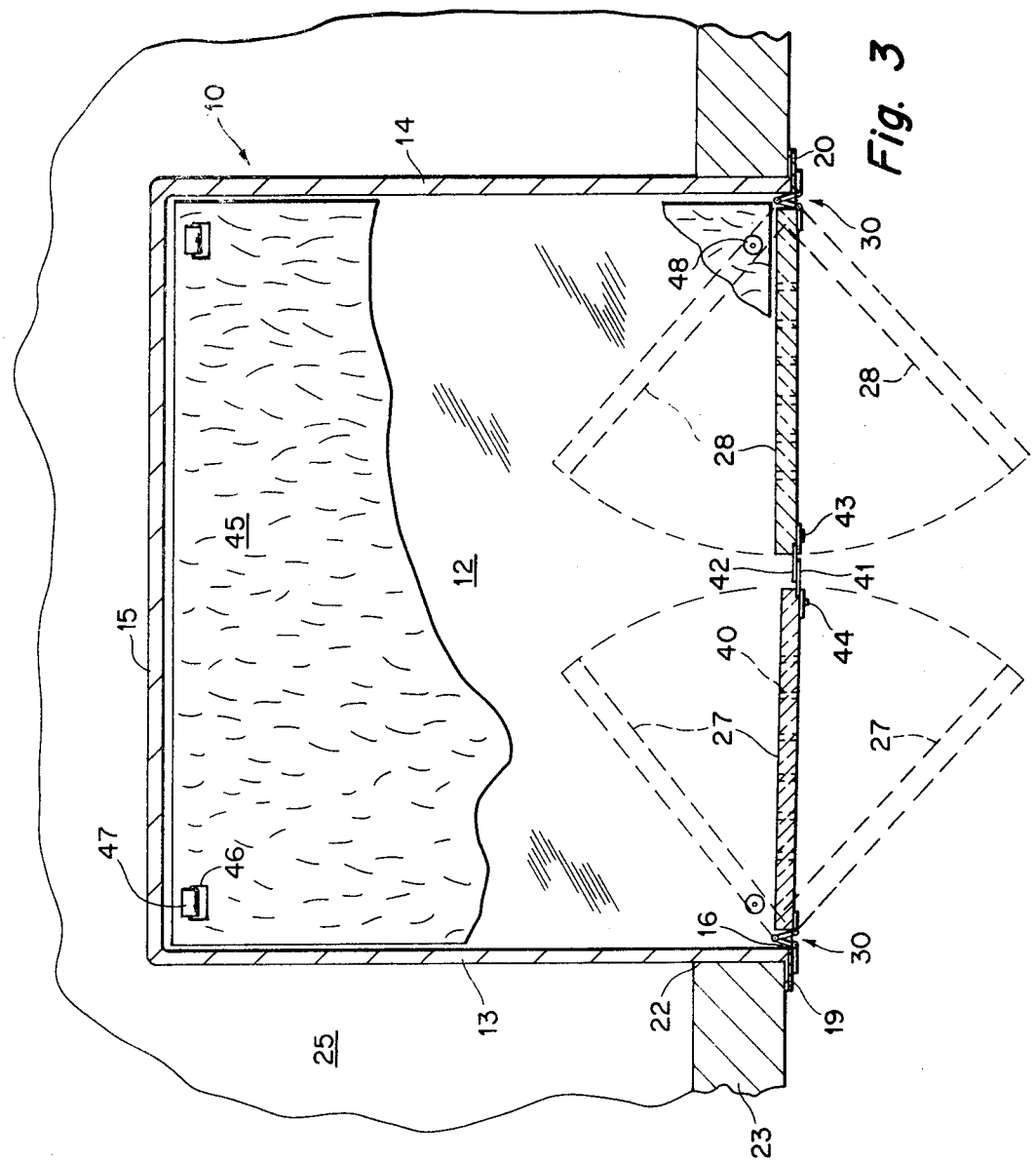

ANIMAL SHELTER

BACKGROUND OF THE INVENTION

This invention relates to an animal shelter, and more particularly to an animal shelter adapted to be inserted through the opening in a building wall.

There are many different types of closures covering openings through doors, windows or walls of buildings, to permit the entry or exit of animals. Many of these closures are adapted to be opened by the animal.

The Giles U.S. Pat. No. 2,932,279 discloses a small animal shelter extending through an opening in a building wall to permit the rear portion of the shelter to be warmed by the interior space of the building. However, there is no complete closure of the exterior opening between the shelter and the exterior of the building. Furthermore, the shelter body is not completely sealed against the transmission of air or other gases between the interior of the shelter and the interior of the building.

SUMMARY OF THE INVENTION

It is therefore an object of this invention to provide a hollow animal shelter adapted to be cantilevered through the opening in a building wall so that the rear portion of the shelter is in heat conductive relationship with the interior of the building.

Furthermore, it is an object of this invention to provide a pair of double-acting hinged doors normally to cover the exterior opening, but adapted to be swung inward or outward by the animal when he enters or leaves the shelter.

Furthermore, it is an object of this invention to provide a hollow animal shelter having solid, integrally formed, preferably molded, walls impervious to the transmission of gases between the interior of the shelter and the interior of the building. Such impervious walls not only eliminate transmission of odors, bacteria and other undesired elements from the animal shelter into the interior of the building, but also facilitate the cleaning of the interior of the shelter. Such an integral wall structure also facilitates the manufacture of the hollow body in a unitary piece by molding from various plastic materials.

The marginal flange surrounding the front end opening of the hollow body also prevents the hollow body from being thrust too far into the interior of the building.

BRIEF DESCRIPTION OF THE DRAWINGS

FIG. 1 is a front perspective view of the animal shelter, made in accordance with this invention, mounted in the opening of a building wall;

FIG. 2 is a section taken along the line 2—2 of FIG. 1;

FIG. 3 is a section taken along the line 3—3 of FIG. 1, illustrating the various swinging positions of the doors; and FIG. 4 is an enlarged perspective view of a double-acting hinge supporting one of the doors within the frame, with the door slightly separated from the edge of the front opening.

DESCRIPTION OF THE PREFERRED EMBODIMENT

Referring now to the drawings in more detail, the animal shelter 10 made in accordance with this invention is preferably a unitary hollow body, and preferably molded of a homogeneous plastic material, such as fiberglass. The shelter 10 has a top wall 11, a bottom wall 12, side or end walls 13 and 14, and a rear wall 15, all of which are made of impervious material and imperviously sealed at their joints.

The front of the hollow body or shelter 10 forms a rectangular opening 16. The margin of the front opening 16 comprises laterally extending flanges, such as the top flange 17, the bottom flange 18, and the two side flanges 19 and 20. These marginal flanges 17 – 20 lie in the same plane of opening 16, which is substantially normal to the front-to-rear axis of the shelter 10. The top flange 17 projects above the outer surface of the top wall 11, while the bottom flange 18 projects below the bottom surface or bottom wall 12. In the same manner, the side flanges 19 and 20 project outwardly beyond the outer surfaces of their respective side walls 13 and 14.

The shelter 10 is adapted to be inserted from front to rear through a mating opening 22 in a building wall 23. In order for the shelter 10 to function properly, the cross-section of the opening 22 must be of the same shape, but slightly larger than the cross-section formed by the walls 11, 12, 13 and 14. However, the building opening 22 must be smaller in cross-sectional size and shape than the periphery formed by the exterior edges of the flanges 17 – 20.

The length of the body 10 preferably should be longer than the depth of the opening 22 so that when the body 10 is inserted through the opening 22, until the front face of the wall 23 is engaged by the flange 17 – 20, the rear portion of the body 15 will project into the interior space 25 of the building.

Of course, the body 10 must be sufficiently large to comfortably receive the animal to be sheltered, such as a dog or a cat.

Mounted in the opening 16 to close the opening 16 are a pair of swinging doors 27 and 28. Each door 27 and 28 is mounted along its remote edge to the corresponding side margin of the opening 16, or in other words, to the corresponding side flange 19 and 20 by means of double-acting hinges 30. The double-acting hinge 30 is so constructed that each door 27 and 28 will normally, that is when no force is exerted upon the doors 27 and 28, lie coplanar with each other and the plane of the opening 16, in closed position. However, when a force is exerted either inward or outward upon the doors 27 and 28, they will swing in response to that force to positions such as those disclosed in dashed lines in FIG. 3.

FIG. 3, and particularly FIG. 4, disclose a typical double-acting hinge structure 30. One support plate 31 of the hinge 30 is fastened to the margin of the opening 16, such as the side flange 20 in FIG. 4. The other support plate 32 is securely fixed to the front face of the adjacent portion of the door 28. A pair of hinge plates 33 and 34 are pivotally connected to each other by a middle hinge pin 35, and at their opposite edges to the support plates 31 and 32 by the outer hinge pins 36 and 37, respectively. In FIG. 4, the door 28 is shown slightly removed from the edge of the side flange 20 in order to better show the hinge construction. In operative position, the door 28 would be much closer to the edge of the side flange 20 with the hinge plates 33 and 34 contacting each other and also the opposing surfaces of the side flange 20 and the edge of the door 28.

The doors 27 and 28 are disclosed as being identical to each other in size and shape and also made of a solid transparent material, not only to protect the animal within the shelter 10 from the elements, but also to permit the interior of the shelter 10 to be clearly observed, even when the doors 27 and 28 are closed.

Since the walls 11 – 15 of the hollow body 10 are completely impervious to the transmission of gases, and the doors 27 and 28 are of solid material, the forwardly declining ventilator apertures 40 are provided in each of the doors 27 and 28. The apertures 40 decline forward in order to prevent rain and other moisture from blowing into the interior of the shelter 10.

If desired, the opposing free vertical edges of the doors 27 and 28 may be provided with overlapping flexible weather flaps 41 and 42, and may also be provided with any type of latching means, such as the hook 43 and cooperating keeper 44.

The top surface of the bottom wall, or floor, 12 may be covered with a mat 45, if desired, as disclosed in FIG. 3. The mat 45 includes rear apertures 46 adapted to fit over upwardly projecting hooks 47 from floor 12, while the front edge of the mat 45 is secured to the floor 12 by means of snap-acting fasteners 48. FIG. 1 discloses body 10 with the mat 45 removed. FIG. 2 discloses a plain floor 12 without hooks 47 or snap-acting fasteners 48.

As best disclosed in FIG. 2, the shelter 10 is inserted through the opening 22, which may be pre-formed to accommodate the cross-section of the shelter 10, until the flanges 17 – 20 engage the front face of the wall 23. In this position, the shelter 10 is cantilevered through the opening 22 into the interior building space 25. In this manner, the heat from the interior space 25 is in contact with the walls of the body 10, and even if the materials of the walls are poor heat conductors, nevertheless eventually the heat from the interior space 25 will be transmitted through the walls of the body 10 to the interior space of the shelter 10.

Furthermore, an animal, such as a dog, normally living out of doors, can enter the shelter 10 by merely pushing against the doors 27 and 28, which automatically swing inward to permit the animal to enter. As soon as the animal has cleared the doors 27 and 28, they will automatically swing back to their normally closed position, as disclosed in solid lines in FIGS. 1, 2 and 3.

The animal may just as easily leave the shelter by thrusting the doors 27 and 28 outward to a position such as that disclosed in dashed lines in FIG. 3. In this manner, the animal may protect himself from the elements and keep himself warm, without assistance from his master and without any additional heating means. Moreover, the undesirable dirt, bacteria, insects and odors carried by the animal will not be transferred to the interior of the building space 25, but will be retained within the interior of the hollow shelter body 10.

What is claimed is:

1. An animal shelter in combination with a vertical building wall of predetermined thickness having a front surface opposing an exterior space and a rear surface opposing an interior space and an opening of predetermined size and uniform cross-section extending through said wall from said exterior space to said interior space, comprising:
   a. a hollow body having closed top, bottom, opposite side, and rear end walls, and an open front end, said body having a longitudinal axis extending front-to-rear,
   b. said hollow body extending longitudinally through said opening and having a vertical transverse cross-section substantially equal to the cross-section of said opening,
   c. the length of said body being greater than the thickness of said building wall,
   d. the front portion of said body being mounted in said opening to cantilever support the rear portion of said body projecting rearward beyond the rear surface of said building wall,
   e. the front ends of at least one of said top, bottom and side walls terminating in a retaining flange projecting laterally outwardly of said corresponding wall and flush against the front surface of said building wall to limit rearward movement of said body relative to said opening,
   f. said walls being in heat-conductive relationship with the interior space of said building, and impervious to the transmission of gas between the interior of said body and the interior space of said building,
   g. a pair of doors adapted to cover said open front end, said doors having proximate side edges and remote side edges,
   h. double-acting hinge means connecting the remote side edges of said doors to the front ends of said side walls so that said doors normally rest in a closed position, said hinge means permitting said doors to swing about vertical axes to a rearward open position when a rearward thrust is exerted upon said doors, and to swing about vertical axes to a forward position when a forward thrust is exerted upon said doors.

2. The invention according to claim 1 in which said doors are made of solid material, and ventilator apertures extend through said doors.

3. The invention according to claim 1 in which the cross-sectional shapes of said opening and said body are rectangular.

4. The invention according to claim 1 in which the front end of each of said top, bottom and side walls terminate in a retaining flange.

* * * * *